United States Patent [19]

Spurrier

[11] Patent Number: 4,572,876
[45] Date of Patent: Feb. 25, 1986

[54] APPARATUS FOR SUPPLYING ELECTROLYTE TO FUEL CELL STACKS

[75] Inventor: Francis R. Spurrier, Whitehall, Pa.

[73] Assignee: Westinghouse Electric Corp., Pittsburgh, Pa.

[21] Appl. No.: 718,773

[22] Filed: Apr. 1, 1985

[51] Int. Cl.[4] .............................................. H01M 8/04
[52] U.S. Cl. ...................................... 429/34; 429/39; 429/14
[58] Field of Search ..................... 429/14, 34, 38, 39, 429/12, 3, 72

[56] References Cited

U.S. PATENT DOCUMENTS

| | | | |
|---|---|---|---|
| 3,274,029 | 9/1966 | Lurie et al. | 429/14 |
| 3,300,341 | 1/1967 | Gregory et al. | 429/24 |
| 3,525,643 | 8/1970 | Spahrbier et al. | 429/15 |
| 3,560,264 | 2/1971 | Biddick | 429/22 |
| 3,615,845 | 10/1971 | Gray | 429/34 |
| 3,690,954 | 9/1972 | Warszawski et al. | 429/39 |
| 3,708,341 | 1/1973 | Biddick | 429/34 |
| 3,748,179 | 7/1973 | Bushnell | 429/38 |
| 3,806,370 | 4/1974 | Nischik | 429/34 X |
| 3,814,631 | 6/1974 | Warszawski et al. | 429/39 |
| 4,039,728 | 8/1977 | Cheron | 429/22 |
| 4,276,355 | 6/1981 | Kothmann et al. | 429/26 |
| 4,292,379 | 9/1981 | Kothmann | 429/34 X |
| 4,305,999 | 12/1981 | Zaromb | 429/14 |
| 4,324,844 | 4/1982 | Kothmann | 429/26 |
| 4,366,211 | 12/1982 | Pollack | 429/38 |
| 4,383,099 | 5/1983 | Kothmann | 429/39 |

Primary Examiner—Anthony Skapars
Attorney, Agent, or Firm—D. M. Satina

[57] ABSTRACT

Apparatus for use with existing electrolyte passage means for replenishing electrolyte within the fuel cell stacks of a fuel cell stack module to keep the matrices in the optimum electrolyte-wetted condition. Pump means is provided to withdraw a predetermined volume of electrolyte from electrolyte reservoir means and propel it in a series of pulses of predetermined duration through transfer means to distribution means which divides the electrolyte volume into streams according to the number of fuel cell stacks in the module. Each portion of the electrolyte volume is then introduced into existing electrolyte passage means. The pulses of electrolyte must be of a sufficiently short duration that no electrolyte streams are still issuing within distribution means when electrolyte has reached electrolyte passage means of the fuel cell stacks. If the streams are still issuing at this time, a circuit will be completed between the fuel cell stacks through the electrically conductive electrolyte, damaging the stacks. Gravity assists the electrolyte through electrolyte passage means within the fuel cell stacks. Drainage means conveys electrolyte not absorbed by the fuel cell matrices to electrolyte reservoir means for recirculation. Electrolyte reservoir means may comprise a tank positioned within the fuel cell stack module or an external tank. Filtration means may be employed to prevent recirculation of debris and corrosion products. The apparatus works equally well with a basic electrolyte as it does with an acid electrolyte. Vent means may be employed to pressure balance the apparatus.

8 Claims, 7 Drawing Figures

APPARATUS FOR SUPPLYING ELECTROLYTE TO FUEL CELL STACKS

GOVERNMENT CONTRACT

The invention disclosed herein was made or conceived in the course of or under a contract with the United States Government identified as No. DEN-3-290.

BACKGROUND OF THE INVENTION

This invention relates to fuel cells utilizing a liquid electrolyte contained in a porous matrix between the electrodes of each fuel cell and, more particularly, to apparatus for supplying liquid electrolyte to the fuel cell stacks in a fuel cell module for replenishment purposes.

Among the various types of fuel cell systems are those which include subassemblies of bipolar plates between which are supported electrodes and a liquid electrolyte contained in a porous matrix. The subassemblies, herein referred to as fuel cells, are oriented one atop another and electrically connected in series, or otherwise, to form a fuel cell stack. During exemplary operation of the fuel cell, the exothermic reaction of hydrogen and oxygen produces heat, electrical energy, and water, making cooling of the cell components necessary in order to maintain component integrity. Liquid or gaseous cooling fluids have therefore been passed through the stack to remove heat. Accordingly, three fluid mediums, a fuel, an oxidant, and a cooling fluid, flow in some manner into and out of the fuel cell stack.

Optimum performance of a fuel cell results when the porous matrix is wetted by the liquid electrolyte and the remaining area around the matrix is wetted to maintain the matrix in the electrolyte-wetted condition. Wetting of the matrix is required to transport ions and to provide a seal which prevents mixing of the reacting gas streams. After a period of operation, the fuel cells suffer performance degradation due to gradual loss of the electrolyte by evaporation to the gas streams, causing a drying-out at the electrolyte matrix-electrode interfaces.

Electrolyte replenishment is currently carried out during periods of shutdown since the wicking characteristics of the matrices and flow resistance in the acid passages make replenishment time consuming. If electrolyte is added faster than it can be accommodated by the fuel cell, a large hydrostatic head is produced and the excess electrolyte is forced into the electrodes of the cell with resultant flooding of the electrodes, adversely affecting the electrochemical performance of the cell.

Commercial fuel cell applications require extended periods of continuous operations resulting in the elimination of the shutdown periods during which make-up electrolyte has been added. A system for replenishing electrolyte during fuel cell operation is desirable.

SUMMARY OF THE INVENTION

There is provided apparatus for supplying a predetermined volume of liquid electrolyte to electrolyte passage means of each fuel cell stack in a fuel cell module without creating a short circuit between the fuel cell stacks through the electrically conductive electrolyte.

A conventional fuel cell module is comprised of a plurality of fuel cell stacks. Each fuel cell stack is comprised of a plurality of fuel cells. Each fuel cell includes in a horizontal orientation an anode electrode, a cathode electrode, a porous matrix sandwiched between the electrodes to contain a liquid electrolyte, a top bipolar plate, and a bottom bipolar plate. Each fuel cell stack further comprises fuel path means and oxidant path means each extending in a horizontal direction. Also included in each fuel cell stack is electrolyte passage means, which directs electrolyte from the top of the stack through each fuel cell, wetting the matrices with electrolyte.

In accordance with the present invention, there is provided apparatus for supplying electrolyte to electrolyte passage means of each fuel cell stack in the fuel cell module as required to keep the matrix-electrode interfaces wetted with electrolyte. The electrolyte supply apparatus comprises pump means for delivering a predetermined pumped volume of electrolyte in a series of predetermined periodic pulses from reservoir means through electrolyte transfer means to electrolyte distribution means. Electrolyte distribution means divides the electrolyte volume into as many electrolyte streams as there are fuel cell stacks in the fuel cell module and delivers each stream to stack supply means for transporting the electrolyte to electrolyte passage means within each fuel cell stack. Each pulse of electrolyte provided by pump means is of a sufficiently short duration that the electrolyte streams produced within distribution means have ceased before any electrolyte has reached the fuel cell stacks by way of stack supply means. If the electrolyte streams were issuing when electrolyte reached the fuel cell stacks through stack supply means, a short circuit would be produced through the electrically conductive electrolyte due to the potential differences between the fuel cell stacks. The electrolyte supply apparatus also comprises drainage means for returning electrolyte not absorbed by the fuel cell matrices to reservoir means.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENT

Figure 1:
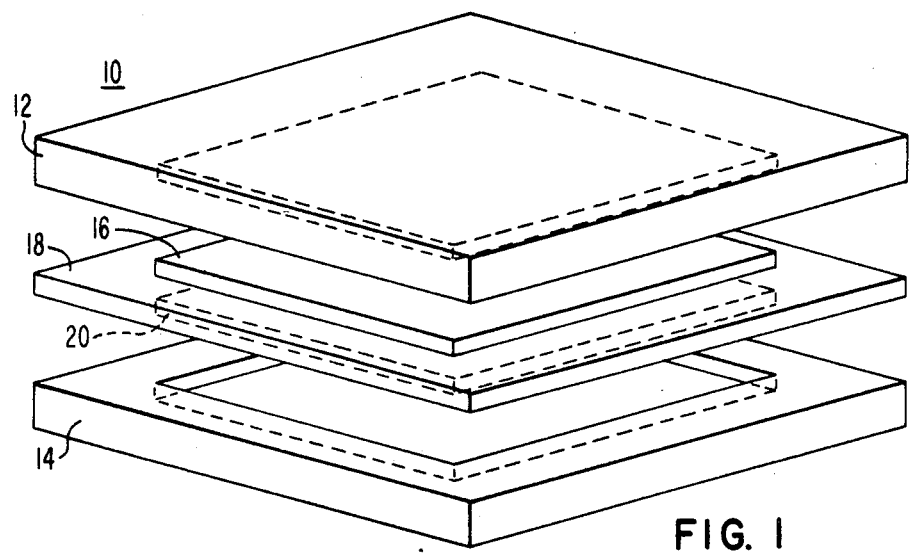
FIG. 1 is an exploded isometric view of a single fuel cell with the electrolyte passage means and other portions of the fuel cell omitted for clarity.

Referring now to the drawings, a single fuel cell 10 is represented in FIG. 1 and generally includes top bipolar plate 12 and bottom bipolar plate 14, between which are sandwiched anode electrode 16, electrolyte-containing porous matrix 18, and cathode electrode 20. Plates 12 and 14 may comprise a material such as compression molded graphite-resin composite and electrodes 16 and 20 may be of a porous graphite material provided with a porous graphite fiber backing for added structural integrity. The matrix 18 may be of porous graphite wetted with an acid such as phosphoric acid. A minimum of two fuel cells 10 are united to form a fuel cell stack, a portion of such a stack being represented by numeral 22 in FIG. 2, resulting in top bipolar plate 12 of each fuel cell also acting as the bottom bipolar plate for the fuel cell immediately above it and bottom bipolar plate 14 of each fuel cell also acting as the top bipolar plate for the fuel cell immediately below it. A full fuel cell stack, such as fuel cell stack 25, shown in FIG. 4, typically includes as end plates half-bipolar plates, with top half-bipolar plate 12a serving as the upper end plate and bottom half-bipolar plate 14a serving as the lower end plate.

Figure 3:
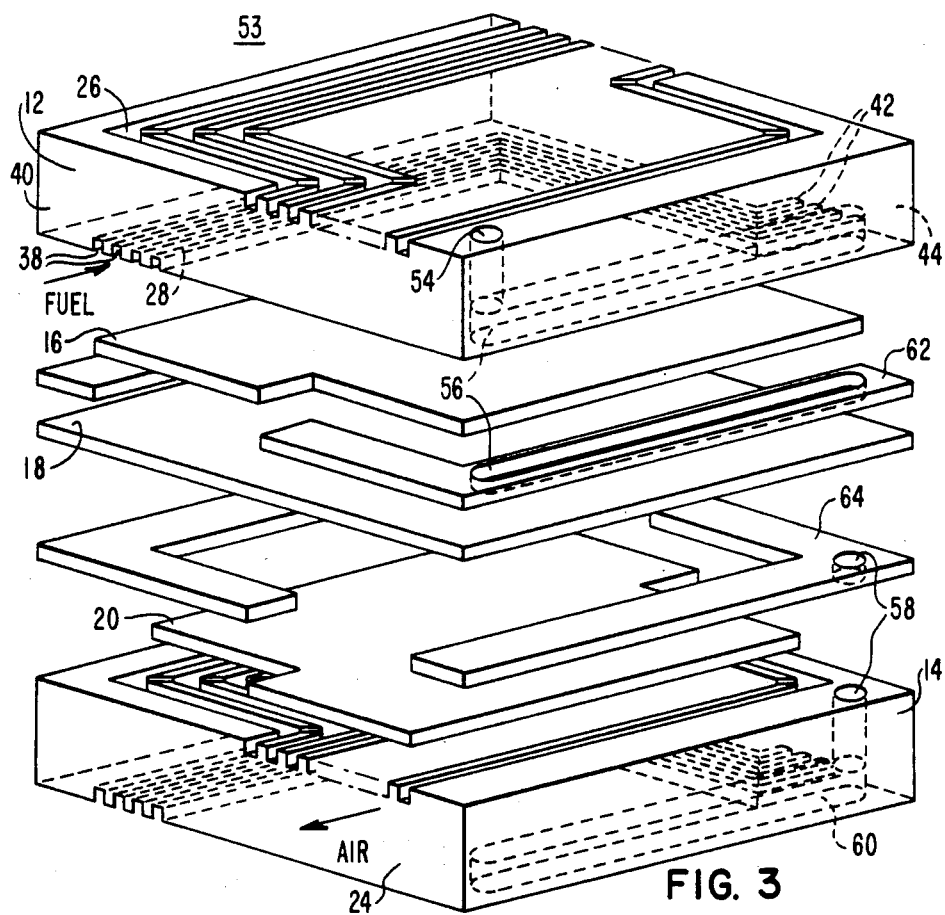
FIG. 3 is an exploded isometric view of a portion of a fuel cell stack provided with electrolyte passage means.
Figure 2:
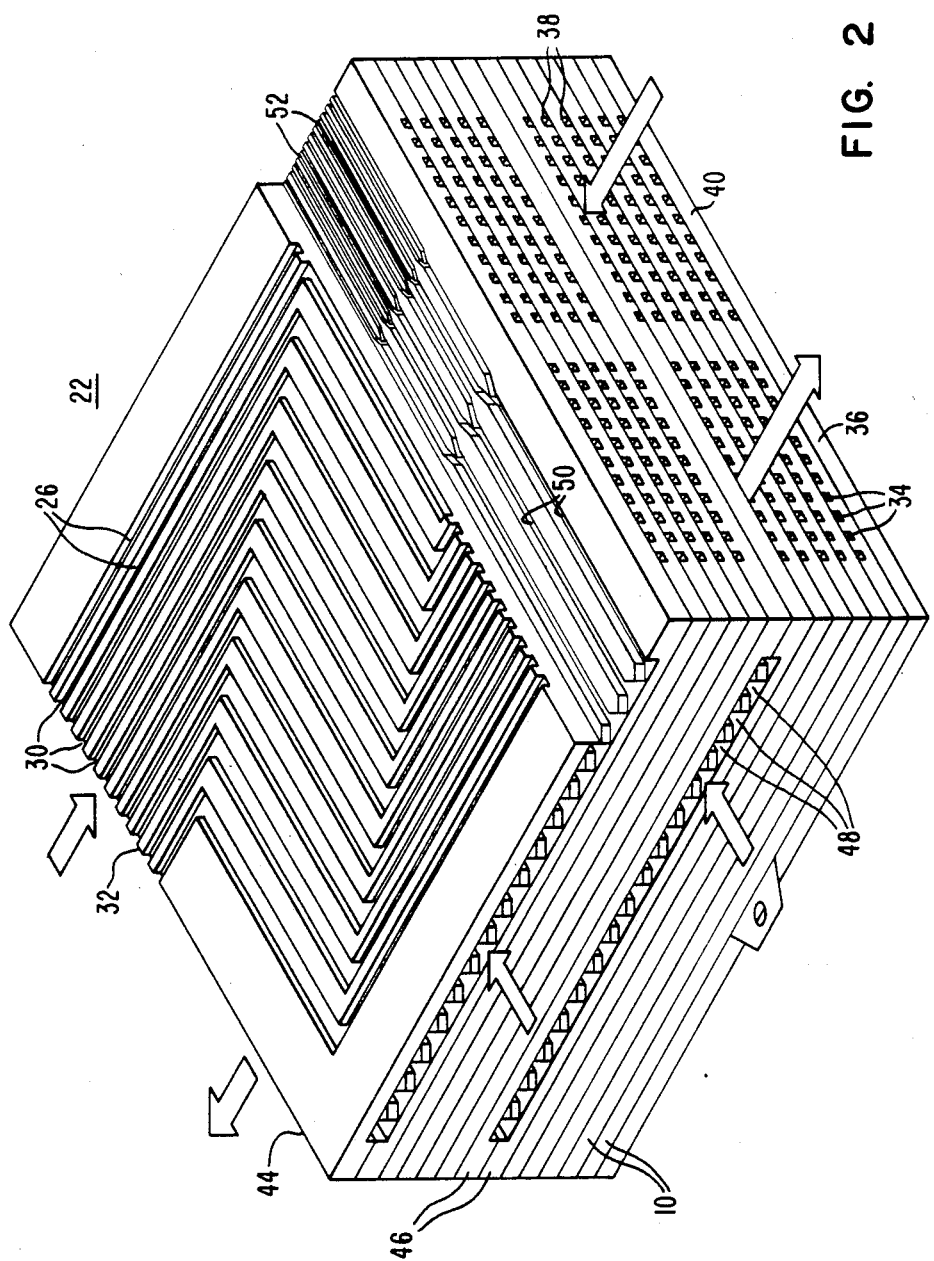
FIG. 2 is an isometric view of a portion of a fuel cell stack with portions cut away for clarity employing the fuel cell of FIG. 1.

In the fuel cell stack, a portion of which is depicted as numeral 22 in FIG. 2, an oxidant, such as a halogen, air, or other oxygen containing material, flows through oxidant path means, which may be oxidant channels 26 of double-L or Z-shaped configuration. A fuel such as hydrogen, organics, or metals, flows through fuel path means, which may be Z-shaped fuel channels 28 as best illustrated in FIG. 3. Manifolds (not shown) are typically utilized to provide oxidant to oxidant inlets 30 disposed in oxidant inlet section 32 of the fuel cell stack portion 22 and to receive oxidant from oxidant outlets 34 in oxidant outlet section 36. Similar manifolds (not shown) are used to supply fuel to fuel inlets 38 in fuel inlet section 40 of the fuel cell stack and to receive fuel from fuel outlets 42 (shown in FIG. 3) in fuel outlet section 44. Electrical power and heat are generated by the interaction of the fuel and oxidant through electrodes 16 and 20 and electrolyte matrix 18. An exemplary fuel cell utilizes hydrogen fuel, air as the oxidant, and a phosphoric acid electrolyte.

A substantial amount of heat is generated by the electrochemical reaction and, accordingly, each fuel cell stack includes cooling plates 46 placed between fuel cells 10 at positions in stack 22 dependent upon the operating temperature desired. A preferred arrangement of cooling plates 46 is depicted in FIG. 2 on stack portion 22. Cooling plates 46 include cooling air inlets 48, cooling passages 50 which are preferably oriented generally perpendicular to fuel and oxidant inlets and outlets, and cooling air outlets 52. The cooling air passages 50 may be of varying cross section with a smaller cross-sectional area but larger surface area at outlets 52, enabling the cooling air, which was warmed as it traversed cooling passages 50 with a resulting reduction in cooling efficiency, to contact a larger surface area to increase its cooling ability. Incorporated into the surfaces of cooling plates 46 opposite from the surfaces containing cooling passages 50 are either Z-shaped oxidant channels 26 or fuel channels 28, as appropriate.

Fuel cell stack portion 53 depicted in FIG. 3 is provided with electrolyte passage means, which may comprise acid electrolyte fill hole 54, acid groove 56, fill hole 58, and acid groove 60. Fuel cell stack portion 53 is shown with acid groove 56 above matrix 18, which is the preferred embodiment, although the acid grooves can be located below the matrices. If shim 62 is employed, it cooperates with adjacent top bipolar plate 12 to form acid groove 56. Similarly, optional shim 64 cooperates with bottom bipolar plate 14 to form fill hole 58.

Electrolyte passage means as hereinbefore described supplies electrolyte to the fuel cell matrices in a back-and-forth or serpentine manner. However, a straight-through or other type of flow path can be employed.

Figure 4:
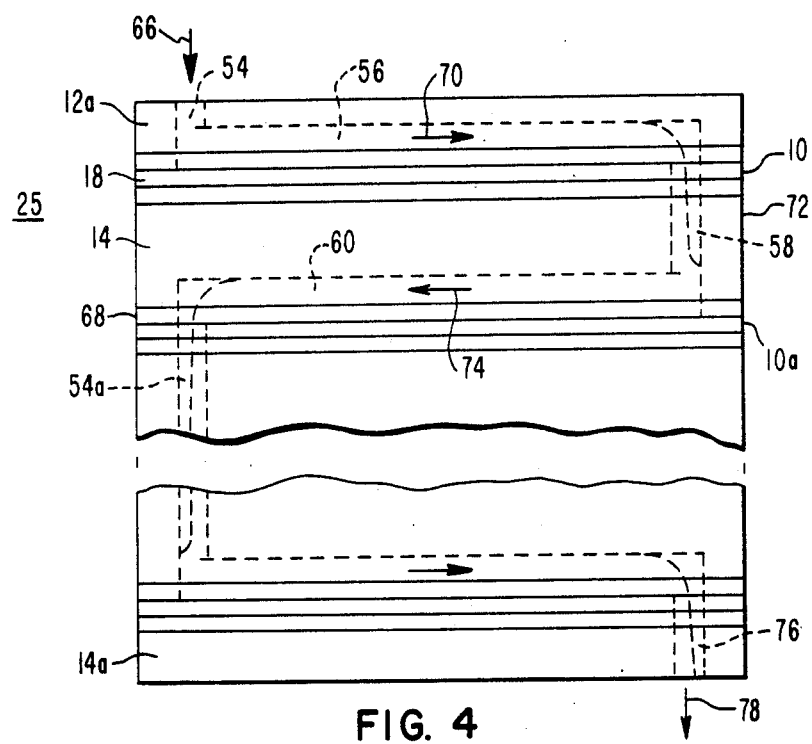
FIG. 4 is an elevational view of a fuel cell stack employing an electrolyte passage means, details of the cells being omitted for purposes of clarity.

Flow of electrolyte through electrolyte passage means is illustrated in FIG. 4. Electrolyte is fed to the top of fuel cell stack 25 through electrolyte fill hole 54 in top half-bipolar plate 12a as indicated by arrow 66. Gravity causes the electrolyte to flow across the upper surface of porous matrix 18 from fuel cell stack side or edge 68 through acid groove 56 in top half-bipolar plate 12a in the direction indicated by arrow 70 to stack side 72, maintaining matrix 18 in the optimum electrolyte-wetted condition. The remaining electrolyte spills through fill hole 58 in bipolar plate 14 into adjacent fuel cell 10a and across groove 60 from stack side 72 in the direction of arrow 74 to stack side 68. The electrolyte passes through fill hole 54a and continues through electrolyte passage means in a back-and-forth or serpentine fashion until it reaches the bottom of the stack, represented by bottom half-bipolar plate 14a. The electrolyte which was not absorbed by the matrices and reaches drain hole 76 passes out of fuel cell stack 25 as indicated by arrow 78 and into drainage means more fully discussed below.

Figure 7:
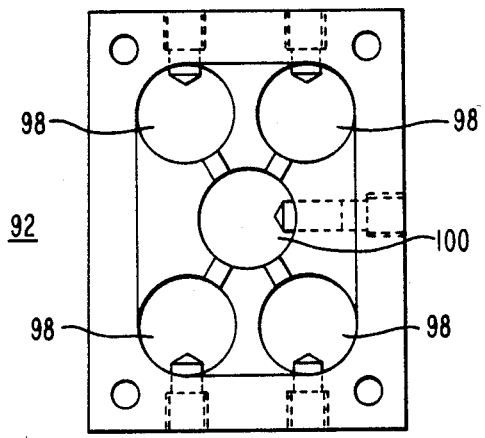
FIG. 7 is a plan view of one embodiment of the electrolyte distribution means of the present invention.
Figure 5:
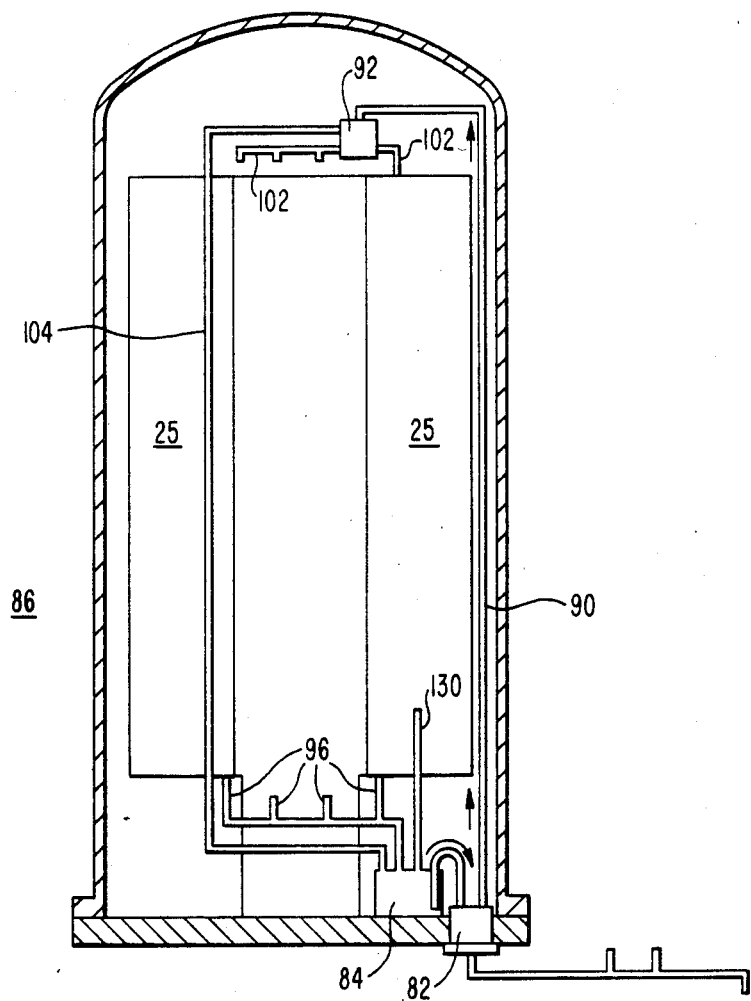
FIG. 5 is an elevational view, partly in section, of a fuel cell stack module with portions omitted for clarity which incorporates an embodiment of the present invention utilizing an electrolyte reservoir means positioned within the fuel cell module.
Figure 6:
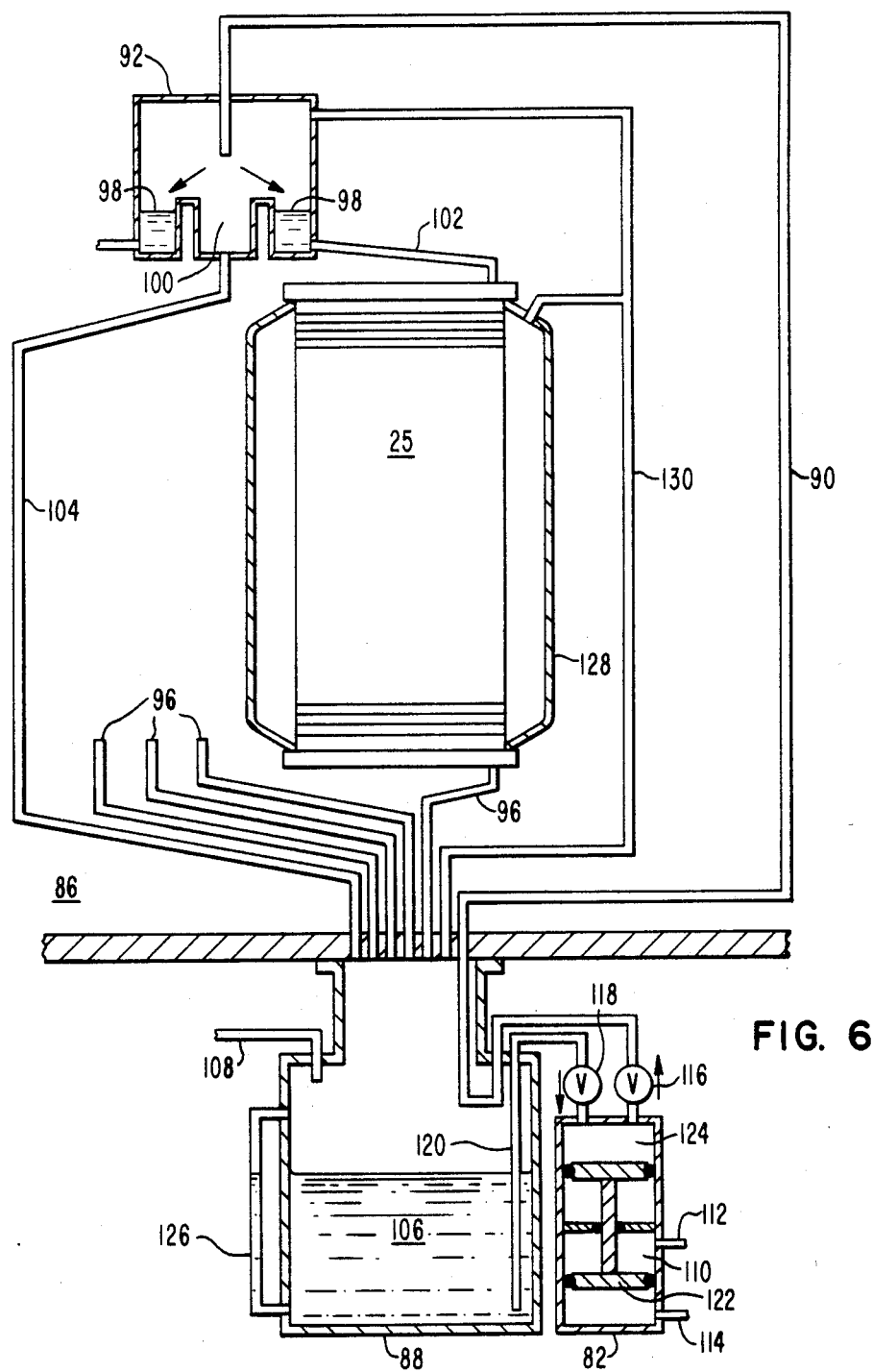
FIG. 6 is a diagrammatic sectional elevation of a portion of a fuel cell stack module which incorporates an embodiment of the present invention utilizing an electrolyte reservoir means positioned outside of the fuel cell module.

In the preferred forms of the invention shown in FIGS. 5 and 6, the electrolyte supply apparatus according to the invention includes pump means, which may be pneumatic pump 82, and electrolyte reservoir means, which may be tank 84 within the fuel cell module 86 as shown in FIG. 5, or external tank 88 as shown in FIG. 6, or other fluid holding means. The electrolyte supply apparatus also includes electrolyte transfer means, such as primary supply line 90, preferably of "Teflon" plastic, electrolyte distribution means, which may include distribution block 92 for distributing electrolyte among all fuel cell stacks 25 in fuel cell module 86, and drainage means, such as drainage lines 96, preferably of "Teflon". Distribution block 92 may include electrolyte receptacle means such as acid chambers 98 depicted in FIG. 7, preferably one for each fuel cell stack 25 in module 86, and overflow chamber 100. Stack supply means such as stack supply lines 102, preferably of "Teflon", connect acid chambers 98 to electrolyte fill hole 54 (shown in FIG. 4) in the top of each stack 25. Overflow return means such as overflow return line 104, preferably of "Teflon", connects overflow chamber 100 to electrolyte tank 88.

Operation of the electrolyte supply apparatus is best described with reference to FIG. 6. Electrolyte 106 is supplied to external electrolyte tank 88 through tank fill means such as tank fill line 108, preferably of "Teflon". Pump means depicted in FIG. 6, pneumatic pump 82 with acid pump chamber 124 and employing air cylinder means such as double-acting air cylinder 110, is actuated by pneumatic supply lines 112 and 114. The apparatus includes check valve assembly means comprised of check valve 116, which controls electrolyte flow in primary supply line 90, and check valve 118 in pump supply line 120, which controls electrolyte flow into pump 82. With check valve 116 closed and check valve 118 open, compressed air is admitted into air cylinder 110 through pneumatic line 112 while pneumatic line 114 is allowed to exhaust, forcing piston means such as piston 122 downward and drawing a predetermined volume of electrolyte from tank 88 through pump supply line 120 into acid pump chamber 124. Check valve 118 is closed, check valve 116 is opened, compressed air is supplied to air cylinder 110 through pneumatic line 114 while pneumatic line 112 is allowed to exhaust, driving piston 122 upward. The predetermined electrolyte volume is forced out of acid pump chamber 124 through primary supply line 90 to distribution block 92. Within distribution block 92, an equal amount of electrolyte is delivered to each acid chamber 98 through orifices (not shown) or other fractionating means. Excess electrolyte flows into overflow chamber 100 and is returned to electrolyte tank 88 through overflow return line 104. Monitoring means such as translucent sight gauge 126 is provided to indicate the level of electrolyte 106 in tank 88 to aid in maintaining a sufficient supply of electrolyte.

Electrolyte from acid chambers 98 is delivered through stack supply lines 102 to fill holes 54 (see FIGS. 3 and 4) in the top of each fuel cell stack 25.

It is imperative that the electrolyte streams have stopped issuing from the orifices before any electrolyte has reached fuel cell stacks 25 through stack supply lines 102. Otherwise, the potential differences between the fuel cell stacks 25 will result in a short circuit through the electrically conductive electrolyte, damaging the fuel cell stacks. For this reason, electrolyte must be delivered in predetermined periodic pulses of short duration by pump 82 rather than by a continuous flow. Gravitational force assists circulation of electrolyte through the fill holes and grooves comprising electrolyte passage means as previously described and electrolyte not absorbed by the porous fuel cell matrices passes out of stack 25 through drain hole 76 (shown in FIG. 4) and is returned to electrolyte tank 88 through drainage line 96. Electrolyte tank 88 and distribution box 92 are pressure balanced to process air outlet manifold 128 through vent means such as vent line 130, preferably of "Teflon". Filtration means (not shown) may be used to prevent circulation of debris and corrosion products through fuel cell stack 25.

A second embodiment of the electrolyte supply apparatus, which is depicted in FIG. 5, utilizes electrolyte tank 84 within fuel cell module 86 in place of external electrolyte tank 88 depicted in FIG. 6. The volume of tank 84 is restricted by the spatial limitations imposed by fuel cell module 86. This second embodiment is otherwise the same as the embodiment depicted in FIG. 6 in components and in operation.

The preferred embodiment has been described with pulsating pneumatic pump 82. However, a pulsating pump actuated electrically, hydraulically, or otherwise could be substituted.

The apparatus has been described for use with an acid electrolyte; however, the apparatus is equally well suited for use with a basic electrolyte.

Many modifications may be made in the abovedescribed apparatus without departing from the spirit and scope thereof. It is thus intended that all matter contained in the foregoing description be interpreted as illustrative, and not in a limiting sense.

I claim:

1. In a fuel cell module having at least two fuel cell stacks, each said fuel cell stack comprising a plurality of fuel cells, each said fuel cell including in a horizontal orientation an anode electrode, a cathode electrode, a porous matrix sandwiched between said electrodes, a top bipolar plate and a bottom bipolar plate, each said fuel cell stack further comprising fuel path means and oxidant path means each extending in a horizontal direction, and electrolyte passage means for guiding electrolyte through each said fuel cell in said fuel cell stack for wetting each said porous matrix with electrolyte, electrolyte supply apparatus for supplying electrolyte to said electrolyte passing means of each said fuel cell stack in said fuel cell module as required to keep the matrix-electrode interfaces wetted with electrolyte, said supply apparatus comprising pump means for delivering a predetermined pumped volume of electrolyte in periodic pulses of predetermined duration from electrolyte reservoir means through electrolyte transfer means to electrolyte distribution means, said electrolyte distribution means dividing said electrolyte pumped volume into as many electrolyte streams as there are fuel cell stacks in said fuel cell module and delivering each said electrolyte stream to stack supply means for transporting the electrolyte from each said electrolyte stream to said electrolyte passage means of each said fuel cell stack, each said periodic pulse of electrolyte provided by said pump means being of a sufficiently short duration that said electrolyte streams produced within said electrolyte distribution means have ceased before any electrolyte has reached said fuel cell stacks by way of said stack supply means so that a short circuit is not created by the potential difference between said fuel cell stacks through the electrically conductive electrolyte, and said electrolyte supply apparatus also comprising drainage means for returning electrolyte not absorbed by said porous matrices to said reservoir means.

2. The apparatus according to claim 1, wherein said electrolyte passage means extends in a back-and-forth serpentine manner through said bipolar plates and said matrices in a first direction substantially vertically and transverse to said fuel path means and said oxidant path means, then in a second direction substantially parallel to said matrices and said fuel and said oxidant path means, then in a third direction substantially vertically and substantially parallel with said first direction, then in a fourth direction opposite to said second direction and substantially parallel thereto, then in a fifth direction substantially aligned with said first direction and said first through said fifth directions for said electrolyte passage means being repeated to produce an overall head uniformly between said fuel cells due to frictional pressure drop in said path for each said fuel cell which is free of a large hydrostatic head to thereby avoid flooding of said electrodes.

3. The apparatus according to claim 2, wherein said bipolar plates include electrolyte grooves formed within each said bipolar plate for flowing the electrolyte in said electrolyte passage means in a horizontal direction to permit the addition of the electrolyte with said half-bipolar plates in a horizontal orientation.

4. The apparatus according to claim 3, wherein said electrolyte distribution means comprises orifice means and electrolyte receptacle means for each said fuel cell stack in said fuel cell module.

5. The apparatus according to claim 4, wherein said electrolyte distribution means further comprises overflow receptacle means for containing any excess electrolyte volume which is introduced over and above the capacity of said electrolyte receptacle means and for directing said excess electrolyte volume into overflow return means for transferring said excess electrolyte volume to said electrolyte reservoir means.

6. The apparatus according to claim 5, wherein said pump means is a pneumatically energized pump including piston means, air cylinder means, and check valve assembly means.

7. The apparatus according to claim 6 further comprising vent means in each said fuel cell stack connecting said electrolyte reservoir means to said distribution means and to the process air outlet manifold of each said stack for balancing the pressure throughout said electrolyte supply apparatus.

8. The apparatus according to claim 7, wherein said fuel cell module is comprised of four fuel cell stacks and said electrolyte distribution means includes four electrolyte receptacle means.

* * * * *